Nov. 15, 1938.  C. A. PRATT  2,136,982
DRAINAGE CHANNEL CLEANER
Filed Oct. 19, 1937  2 Sheets-Sheet 1
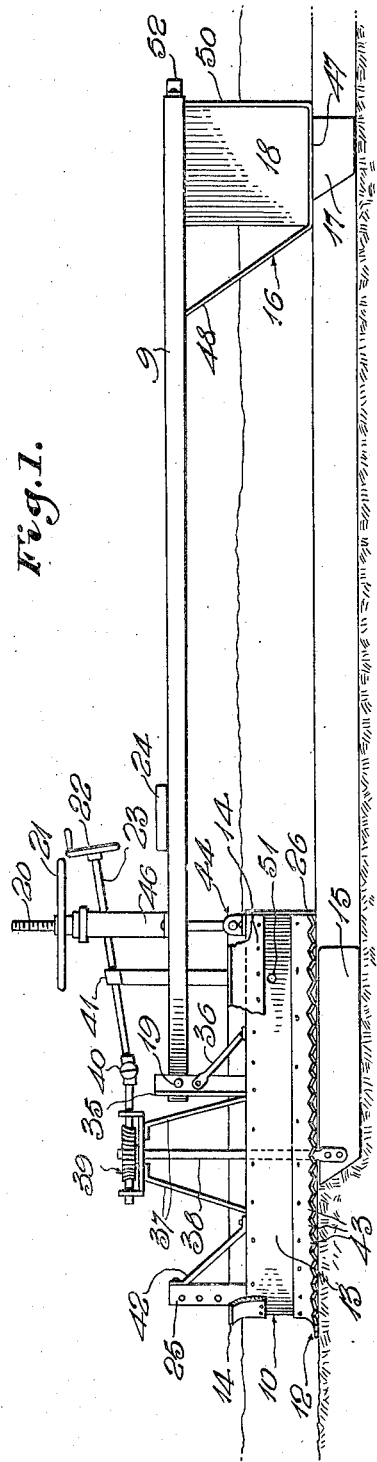
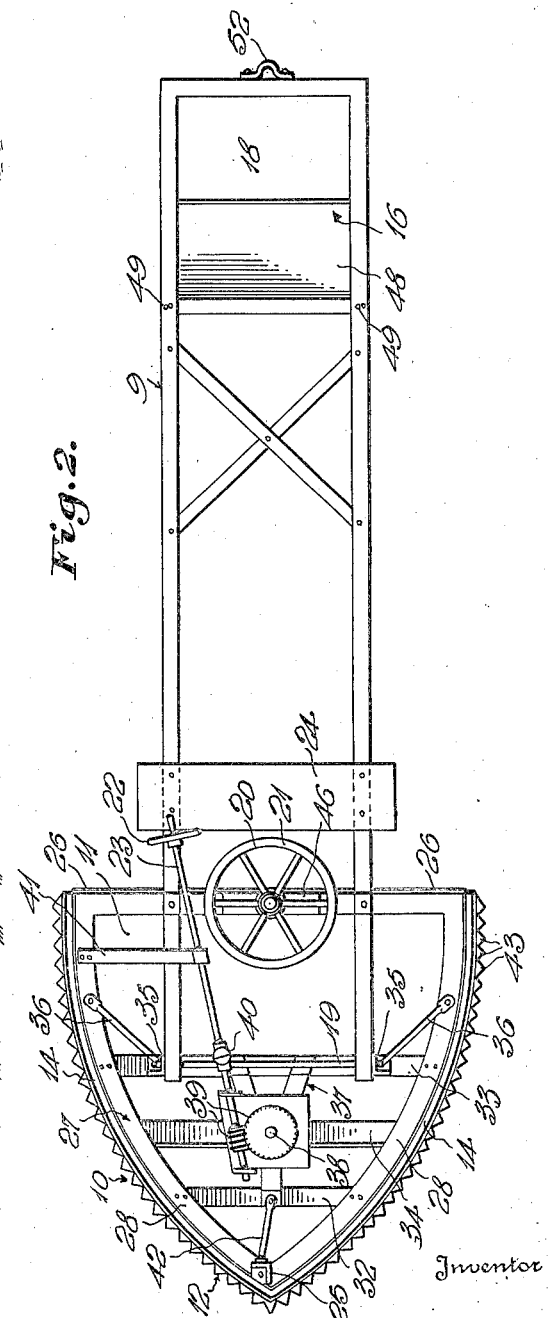
Inventor
Charles A. Pratt Nov. 15, 1938.   C. A. PRATT   2,136,982
DRAINAGE CHANNEL CLEANER
Filed Oct. 19, 1937   2 Sheets-Sheet 2

Inventor
Charles A. Pratt
By H. B. Wilson Yeo
Attorneys

Patented Nov. 15, 1938

2,136,982

UNITED STATES PATENT OFFICE 2,136,982

DRAINAGE CHANNEL CLEANER

Charles A. Pratt, Ysleta, Tex.

Application October 19, 1937, Serial No. 169,887

11 Claims. (Cl. 37—80)

The invention aims to provide a simple, inexpensive, easily operated and efficient machine for cutting weeds and other vegetation in drainage channels and deflecting the cut vegetation and any accumulated silt and debris laterally to the channel sides for easy removal.

With the foregoing in view, the invention resides in the novel subject matter hereinafter described and claimed, description being accomplished by reference to the accompanying drawings.

Fig. 1 is a side elevation.

Fig. 2 is a top plan view.

Figure 3:
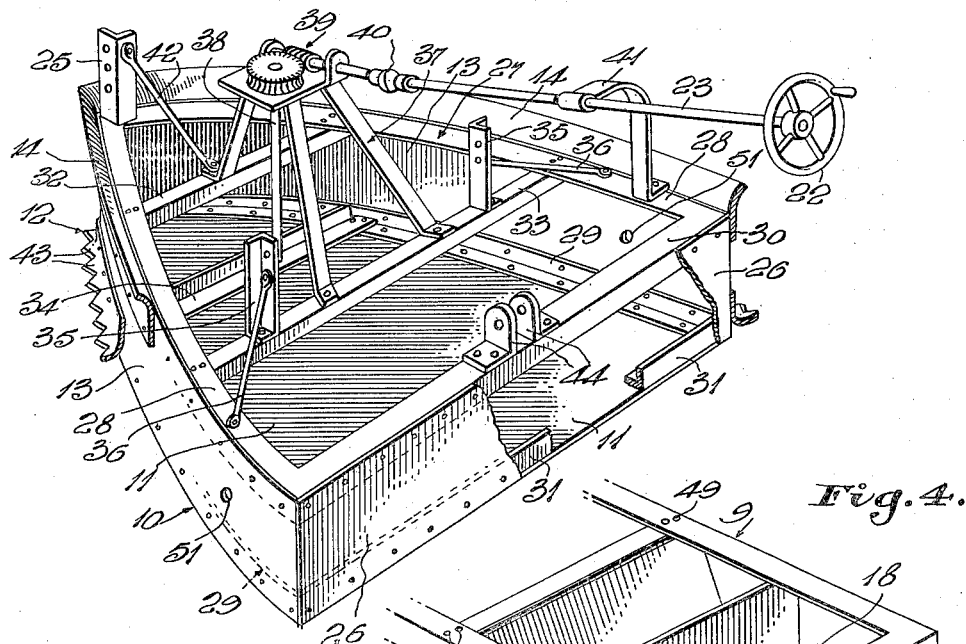
Fig. 3 is a perspective view of the cutter head and parts carried thereby.
Figure 4:
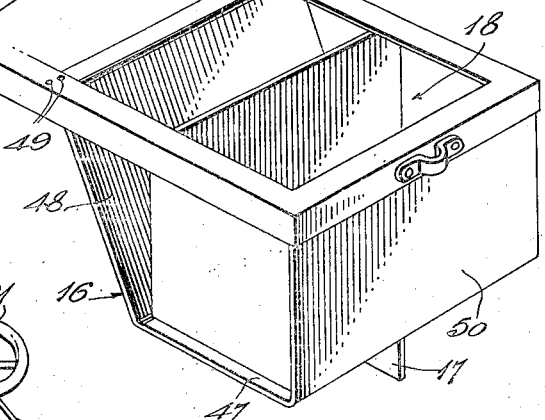
Fig. 4 is a perspective view showing the rear end of the frame and parts connected therewith.
Figure 5:
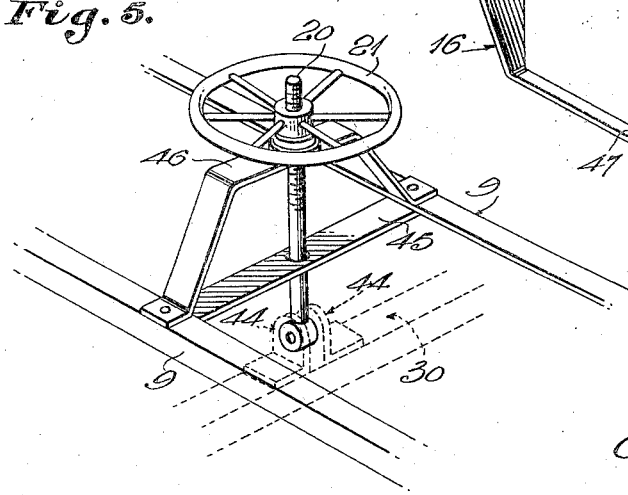
Fig. 5 is a fragmentary perspective view showing the means for tilting the cutter head with respect to the frame.

In the drawings above briefly described, certain structural features have been shown for illustrative purposes, and while they will be rather specifically described, it is to be understood that numerous variations may be made within the scope of the invention as claimed.

The machine includes a horizontally elongated frame 9 formed principally from angle iron, the front end of this frame being supported by a forwardly pointed cutter head 10 having a bottom 11 to slide upon the bottom of a drainage ditch, said cutter head being provided with forwardly converging means 12 for cutting vegetation and being further provided with forwardly converging walls 13 for laterally deflecting the cut vegetation, silt and debris, to the sides of the channel. The upper portion of the cutter head 10 is also preferably provided with outwardly curved, forwardly converging weed guards 14. Directly under the cutter head bottom 11 is a rudder 15 to cut into the channel bottom for steering the machine, and provision is made for turning this rudder as required, as hereinafter fully described.

The rear portion of the frame 9 is supported by a skid 16 to slide upon the channel bottom, and said skid is provided with a keel 17 to cut into the ditch bottom and prevent the rear end of the machine from shifting laterally. Preferably this rear end of the machine is provided with a ballast box 18, and if desired, additional ballast may be placed in the cutter head 10, due to its boat-like form.

The cutter head 10 is pivoted upon a transverse horizontal shaft 19 or similar means, to the front end of the frame 9, and a screw 20 and hand-wheel 21 are provided for tilting said cutter head about the pivot 19 to regulate the depth of cut.

Another hand-wheel 22 is provided on the rear end of a shaft 23, for the purpose of swinging the rudder 15 as required, and the two hand-wheels 21 and 22 are disposed in such relation with a seat 24 on the frame 9 as to be readily operated by a person riding upon said seat, as the machine is pulled along the channel by a team or by a tractor. 25 denotes a suitable hitch for the team or tractor.

The bottom 11 of the cutter head 10 is in the form of a flat metal plate having forwardly converging edges, and the forwardly converging side walls 13 which are also of metal, rise rigidly from said edges of said bottom plate, giving a pointed shape to said cutter head. A rear transverse wall 26 is also preferably provided for this cutter head, and all of the walls 13 and 26, as well as the bottom plate 11, are secured to an appropriate frame 27 formed principally from angle iron. In the present showing, this frame includes two upper forwardly converging side bars 28, two lower forwardly converging side bars 29, upper and lower rear bars 30 and 31, a front transverse bar 32 secured to the bars 28, an intermediate transverse bar 33 secured to said bars 28, and a transverse bar 34 secured to the bars 29. Vertical standards 35 are shown upon the bar 33 and connected with the bars 28 by suitable braces 36, the upper ends of said standards being connected with the front of the frame 9 by means of shaft 19. I have shown a tripod 37 secured to the bars 32 and 33 for rotatably mounting the upper end of the rudder shaft 38 and for supporting worm gearing 39 by means of which said rudder shaft is connected with the front end of the shaft 23, this shaft 23 preferably consisting of sections connected by a universal joint 40, the rear section of said shaft 23 being supported by an appropriate bearing bracket 41 which may well rise from one of the bars 28. The lower end of shaft 38 passes through bearing openings in the bar 34 and the bottom plate 11 and is suitably secured to the rudder 15. The hitch 25 may well be braced to the bar 32 as shown at 42.

The forwardly converging cutting means 12 are preferably in the form of transversely curved plates or bars having teeth 43 similar to saw teeth at their outer edges, said bars or plates projecting outwardly from the lower corners of the cutter head 10. The weed guards 14 are preferably in the form of upwardly and outwardly curved plates; these weed guards and the cutters 12 being bolted or otherwise secured to the cutter head 10.

In the present disclosure, the screw 20 is pivoted to brackets 44 secured to the bar 30 of the head 10, said screw passing loosely through an opening in a transverse bar 45 of the main frame 9 and being threaded in the hub of the hand-wheel 21, which hub is swiveled in the crown portion of an arched frame 46 secured to said frame 9. Thus, rotation of the hand-wheel 21 in one direction will upwardly tilt the nose of the forwardly pointed cutter, while turning said hand-wheel in the other direction will cause downward tilting of said nose, it being thus possible to regulate the depth of cut. Steering of the machine is, of course, effected by rotating the hand-wheel 22 in one direction or the other to swing the rudder 15 as may be required.

The skid 16 preferably comprises a flat horizontal plate portion 47 to slide upon the channel bottom, and a forwardly inclined plate portion 48. The upper or front end of this plate portion 48 may be suitably secured as at 49 to the frame 9, and the rear edge of the plate portion 47 may be held in fixed relation with the frame 9 by means of a vertical plate 50 which plate may well form one wall of the ballast box 18.

Whether the machine be constructed in the exact manner herein disclosed, or in some equivalent manner, it may be easily and advantageously operated to cut weeds, grass and the like in a drainage channel and to deflect the cut vegetation together with any accumulated silt and trash to the sides of the channel for easy removal. The depth of cut may be readily regulated by rotating the hand-wheel 21 and steering may be effected by rotating the hand-wheel 22. When the rudder 15 is pitched in one direction or the other, the keel 17 prevents the rear end of the machine from shifting in one direction or the other so that the front of said machine must respond to the steering mechanism.

When the machine is to be transported from place to place, suitable wheels (not shown) may be connected with the cutter head 10, and the openings 51 formed in the rear portion of said head may be considered for the purpose of receiving an axle for said wheels. The rear end of the frame 9 may be provided with a suitable hitch or the like 52 for supporting it when the front end of the machine is wheel-supported, said hitch 52 being usually connected with a tractor hitch or with the rear end of a wagon or the like.

It will be seen from the foregoing, taken in connection with the accompanying drawings, that novel and advantageous provision has been made for carrying out the objects of the invention. While the details disclosed may be followed if desired, attention is again invited to the possibility of making variations within the scope of the invention as claimed, it being therefore understood that the present disclosure is illustrative rather than limiting.

I claim:—

1. A drainage channel cleaning machine comprising a horizontally elongated frame to travel longitudinally of the channel, a cutter head connected with the front end of said frame having means for cutting vegetation in the channel and deflecting it laterally, means to slide upon the channel bottom to support the front end of the machine, additional means to slide upon the channel bottom to support the rear end of the machine, and steering means for the machine including a vertical rudder to cut into the channel bottom.

2. A drainage channel cleaning machine comprising a horizontally elongated frame to travel longitudinally of the channel, a cutter head connected with the front end of said frame, said cutter head having forwardly converging means for cutting vegetation in the channel and deflecting it laterally, said cutter head being provided with a bottom to slide upon the channel bottom and support the front end of the machine, rear supporting means connected with the rear end of said frame and having a bottom to slide upon the channel bottom and support the rear end of the machine, and steering means for the machine including a vertical rudder under one of said bottoms to cut into the channel bottom.

3. A drainage channel cleaning machine comprising a horizontally elongated frame to travel longitudinally of the channel, a cutter head connected with the front end of said frame, said cutter head having forwardly converging means for cutting vegetation in the channel and deflecting it laterally, said cutter head being provided with a bottom to slide upon the channel bottom, a rudder under said cutter head bottom to cut into the channel bottom, means for turning said rudder to steer the machine, and means connected with the rear end of said frame to slide upon the channel bottom and support the rear end of the machine.

4. A drainage channel cleaning machine comprising a horizontally elongated frame to travel longitudinally of the channel, a cutter head connected with the front end of said frame, said cutter head having forwardly converging means for cutting vegetation in the channel and deflecting it laterally, said cutter head being provided with a bottom to slide upon the channel bottom, a rudder under said cutter head bottom to cut into the channel bottom, means for turning said rudder to steer the machine, a skid connected with the rear end of said frame to slide upon the channel bottom and support the rear end of the machine, and a keel projecting downwardly from said skid to cut into the channel bottom and prevent lateral shifting of said rear end of the machine.

5. A drainage channel cleaning machine comprising a horizontally elongated frame to travel longitudinally of the channel, a cutter head pivoted on a transverse horizontal axis to the front end of said frame and having forwardly converging means for cutting vegetation in the channel and deflecting it laterally, said cutter head being provided with a bottom to slide upon the channel bottom, means for vertically swinging said cutter head about said axis to regulate the depth of cut, a rudder under said cutter head bottom to cut into the channel bottom, means for turning said rudder to guide the machine, a skid under the rear end of said frame to slide upon the channel bottom, and a keel projecting downwardly from said skid to cut into the channel bottom and prevent lateral shifting of the rear end of the frame.

6. In a drainage channel cleaner, an elongated frame to travel longitudinally of the channel, the front end of said frame being provided with supporting means and with vegetation cutting means, a supporting skid secured to the rear end of said frame and having a horizontal plate portion and a forwardly inclined plate portion at the front edge of said horizontal plate portion, a keel secured to and projecting downwardly from said horizontal plate portion, and a ballast box upon said horizontal plate portion.

7. In a drainage channel cleaner, a cutter head comprising a bottom to slide upon the channel bottom, said bottom having longitudinal edges converging forwardly to a point, and side walls in fixed relation with said bottom and rising from said longitudinal edges thereof, said side walls also converging forwardly to a point, vegetation cutting means secured to said cutter head and projecting laterally from the lower corners thereof, and outwardly curved guards extending along the upper edges of said side walls.

8. In a drainage channel cleaner, a forwardly pointed cutter head having means for cutting vegetation in the channel and deflecting it laterally, said cutter head being provided with a bottom to slide upon the channel bottom, a rudder projecting downwardly from said cutter head bottom to cut into the channel bottom, and means for turning said rudder with respect to said cutter head.

9. In a drainage channel cleaner, a cutter head having means for cleaning out the channel, said cutter head being provided with a bottom to slide upon the channel bottom, and a rudder under said bottom to cut into the channel bottom.

10. A drainage channel cleaning machine comprising means for cleaning out the channel, supporting means for said cleaning means having at least one horizontal bottom surface to slide upon the channel bottom, and steering means for the machine including a vertical rudder positioned to cut into the channel bottom.

11. A drainage channel cleaning machine comprising means for cleaning out the channel, supporting means for said cleaning means having at least one horizontal bottom surface to slide upon the channel bottom, and steering means for the machine including a vertical keel near one end of the machine positioned to cut into the channel bottom, and a vertical rudder near the other end of the machine also positioned to cut into the channel bottom.

CHARLES A. PRATT.